United States Patent [19]

Sweet et al.

[11] 4,071,926

[45] Feb. 7, 1978

[54] SAFETY DEVICE FOR LADDER CLIMBERS

[75] Inventors: Robert P. Sweet; Daniel L. Stember, both of Red Wing, Minn.

[73] Assignee: D. B. Enterprises, Inc., Red Wing, Minn.

[21] Appl. No.: 680,281

[22] Filed: Apr. 26, 1976

Related U.S. Application Data

[63] Continuation-in-part of Ser. No. 468,568, May 9, 1974, Pat. No. 3,979,797.

[51] Int. Cl.$^2$ ............................................. F16G 11/00
[52] U.S. Cl. ............................. 24/136 R; 24/134 KB; 182/8
[58] Field of Search ............ 24/136 A, 136 R, 134 E, 24/134 EA, 115 M, 263 CA; 182/5, 8

[56] References Cited

U.S. PATENT DOCUMENTS

| 232,890 | 10/1880 | Hanson | 24/136 |
|---|---|---|---|
| 900,608 | 10/1908 | Steirly | 24/136 R |
| 1,333,375 | 3/1920 | Davis | 24/136 R |
| 1,457,029 | 5/1923 | Hazlett | 24/136 R |
| 1,817,386 | 8/1931 | Maszczyk | 24/136 R |
| 1,976,848 | 10/1934 | Ham | 24/263 CA |
| 3,492,702 | 2/1970 | Stafford | 403/104 |
| 3,811,155 | 5/1974 | Stafford | 24/136 R |

FOREIGN PATENT DOCUMENTS

| 8,944 of | 1909 | United Kingdom | 24/136 R |

*Primary Examiner*—Bernard A. Gelak
*Attorney, Agent, or Firm*—Williamson, Bains, Moore & Hansen

[57] ABSTRACT

A safety clamp slidably mounted on a vertical safety carrier, such as a cable or rod, in proximity to a ladder is attached to a workman's belt by a pivotal actuating arm which shifts a wedge plate into clamping engagement with the safety carrier immediately under free-fall conditions encountered if the workman falls from the ladder. Instantaneous actuation of the wedge plate into clamping engagement with the safety carrier in response to the slightest pivotal movement of the actuating arm towards its closing position is provided by cam action exerted against the wedge plate by the actuating arm and by a cam member on the clamping bracket. Cam follower and guide surfaces on the upper end of the wedge plate cooperate with camming action of the actuating arm against the lower end of the wedge plate to maintain the wedge plate in an upright position of uniform contact with the safety carrier.

11 Claims, 4 Drawing Figures

SAFETY DEVICE FOR LADDER CLIMBERS

BACKGROUND OF THE INVENTION

This application is a continuation-in-part of an earlier filed application of the same assignee filed on May 9, 1974 under Ser. No. 468,568, now U.S. Pat. No. 3,979,797.

Safety clamp devices adapted to be attached to a work-man's belt and having a friction plate or shoe which is moved into gripping engagement with a safety line if the workman falls have been known and in use for many years. See, for example, U.S. Pat. No. 3,317,971 issued to R. E. Meyer on May 9, 1967 and U.S. Pat. No. 3,492,702 issued to L. R. Stafford on Feb. 3, 1970. Such prior safety clamps have had a number of disadvantages and shortcomings. A primary problem has been the inability of prior safety clamps to satisfactorily meet the dual requirements of being freely slidable on a safety cable as a workman goes up and down a ladder, and yet quickly and positively shiftable into clamping engagement with a safety line or cable when the workman falls. Moreover, known safety clamps have not been readily mountable on a safety cable at various vertical positions of desired use.

The safety clamp of this invention incorporates a combination of features which overcome the aforesaid difficulties encountered with previously known safety clamps. Foremost among such features are a camming system which instantly urges a wedge plate through a cable clearance space into uniform engagement with a safety cable over the entire length of the wedge plate under free fall conditions, and the mounting and actuation of the wedge plate so as to permit the friction force of a safety cable acting on it to draw it into very tight, gripping engagement with the cable.

BRIEF SUMMARY OF THE INVENTION

The safety clamp of this invention is particularly characterized by a wedge plate and actuating arm assembly mounted on a clamping bracket so as to provide free, unimpaired sliding movement of the clamping device along a safety cable or rod during normal vertical movement of a workman on a ladder, and to ensure the instantaneous, positive gripping of a safety cable between the wedge plate and an elongated clamping surface on the clamping bracket if the workman falls, without unduly damaging the safety cable.

These basic objects and advantages have been realized by shiftably supporting an elongated wedge plate on a clamping bracket on one end of the pivotal actuating arm with an elongated clamping side of the wedge plate disposed in spaced apart relation to an elongated clamping surface on one end of the clamping bracket for the extension of an elongated safety carrier therebetween. A cam follower surface on one end of the wedge plate is disposed in coacting engagement with a camming member secured to the clamping bracket, with the cam follower surface extending generally upwardly and inwardly towards the aforesaid bracket clamping surface. The outer, free end of the actuating arm is provided with means for attachment to the safety belt of a workman; and, if a workman falls, a tension spring connected between the actuating arm and the wedge plate will pivot the actuating arm outwardly and downwardly with the result that the inner end of the actuating arm will carry the wedge plate upwardly against the camming member. The engagement of a sharply inwardly contoured upper segment of the wedge plate cam follower surface with the camming member instantly urges the wedge plate upwardly and inwardly to a clamping position in engagement with a safety carrier in response to the very slightest pivotal movement of the outer end of the actuating arm in a downward direction.

The aforesaid camming member preferably takes the form of a pin extending horizontally across the clamping bracket, and positioned between the wedge plate camming surface and a guide finger affixed to the wedge plate in parallel, spaced apart relation to the camming surface. The guide finger assists in keeping the wedge plate in a uniformly upright position, parallel to the safety cable, both during normal vertical movement of the clamp on the cable, and in the course of clamping movement against the cable.

The pivotal mounting of the actuating arm on the clamping bracket and the driving association of the inner end of the actuating arm with the wedge plate in such a way that the actuating arm imparts an upward, closing movement to the wedge plate is particularly advantageous. The upward, frictional drag of a safety carrier on the wedge plate under free fall conditions tends to draw the wedge plate towards its clamping or closing position. Thus, with the wedge plate's cam follower surface positioned between the camming member and the bracket clamping surface, the frictional force of the safety carrier will act to pull the wedge plate tightly between the camming member and the safety carrier, thereby resulting in more holding power of the safety clamp on the safety carrier.

To facilitate free, sliding movement of the safety clamp on a safety carrier such as a cable or rod, a substantial clearance space is provided between the clamping side of the wedge plate and the safety carrier, when the clamping bracket is mounted in its position of use on a carrier. Roller assemblies on the top and bottom ends of the wedge plate ensure the free movement of the wedge plate and clamping bracket assembly up and down a safety cable during normal vertical movement of a workman.

A particularly advantageous aspect of my improved safety clamp resides in the provision of an inclined cam guide surface on the wedge plate which angles upwardly and outwardly in a direction away from the clamping side of the wedge plate. The actuating arm is arranged so that a camming surface on its inner end normally bears against the bottom end of the inclined cam guide surface. As the outer end of the actuating arm pivots downwardly under free falling conditions, its inner end will pivot upwardly and revolve against the wedge plate's inclined cam guide surface and thereby assist in urging the wedge plate upwardly and inwardly towards its clamping position in gripping engagement with a safety carrier.

With the aforesaid upwardly and inwardly extending cam follower surface formed on the upper end of the wedge plate, the provision of this latter, inclined cam guide surface on the lower end of the wedge plate ensures that the wedge plate will be maintained in a straight, upright position with its clamping side parallel to the bracket clamping surface and to a safety carrier, as the wedge plate is moved to its clamping position. This mode of operation is further enhanced by the provision of a contact or camming element in the form of a laterally projecting pin on the inner end of the actuating arm. This pin normally bears against the outside edge of the bottom end of the wedge plate. As the actuating arm swings downwardly for clamping, this pin forces the bottom end of the wedge plate inwardly against the safety cable.

These and other objects and advantages of my invention will become readily apparent as the following description is read in conjunction with the accompanying drawings, wherein like reference numerals have been used to designate like elements throughout the several views.

DESCRIPTION OF THE PREFERRED EMBODIMENT

Figure 2:
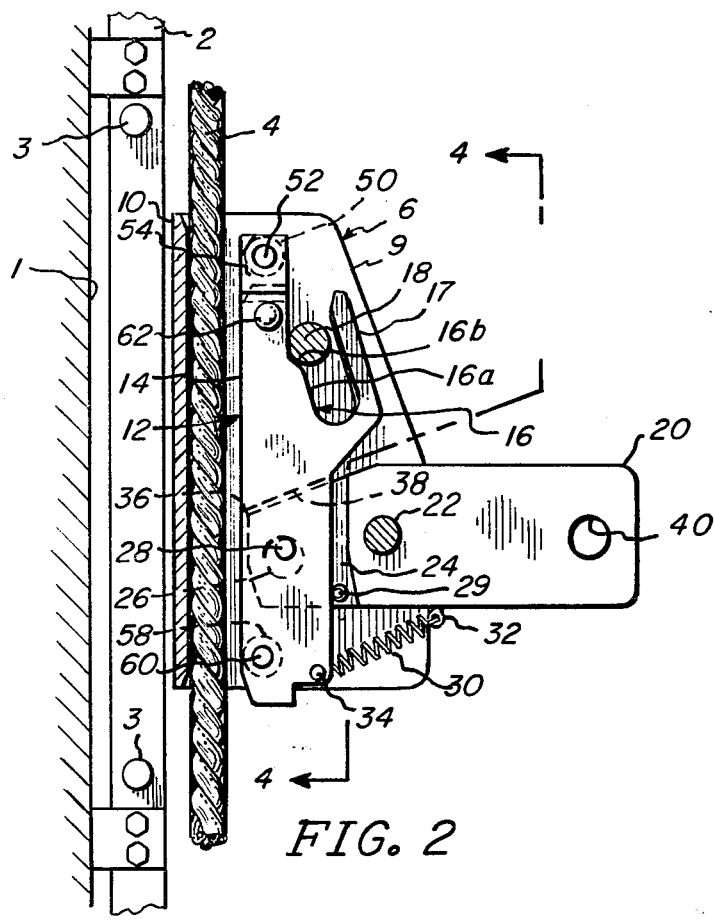
FIG. 2 is a vertical, section view of the safety clamp taken along lines 2—2 of FIG. 1.

The safety clamp of this invention has been developed for use by workmen working on ladders, fixed or removable, in any kind of servicing or work environment at an elevated level. I anticipate that my improved safety clamp will find particularly widespread application with respect to fixed ladders such as those mounted on smokestacks, water tanks, storage tanks, grain elevators and towers and poles of various kinds. In FIG. 2, reference numeral 1 designates an upright portion of such a stack, tank or tower structure to which a fixed ladder 2 is rigidly secured. The vertically spaced ladder rungs are designated by reference numeral 3. An elongated, vertically extending safety carrier 4 is positioned adjacent to the ladder, preferably centrally of the ladder in front of it. Various types of safety carriers such as ropes, cables and rods may be utilized, and such safety carriers are preferably secured at their bottom ends, as well as at their top ends to serve as a safety line on which a clamping device affixed to the belt of a workman may be slidably mounted. In the drawings, safety carrier 4 is illustrated as a steel cable.

Figure 4:
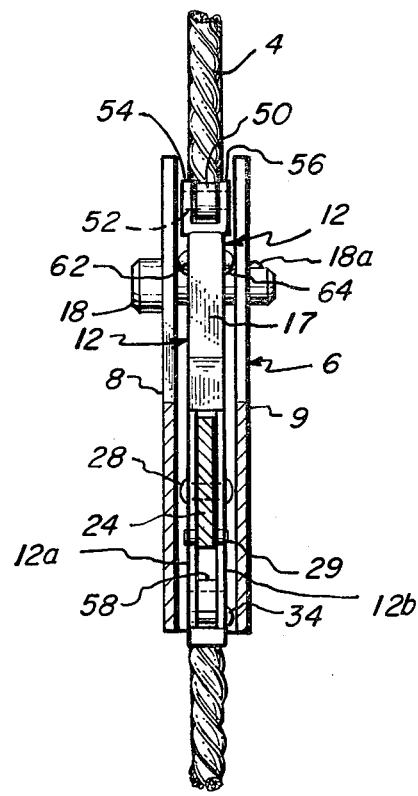
FIG. 4 is a vertical, section view of the safety clamp taken along lines 4—4 of FIG. 2.
Figure 3:
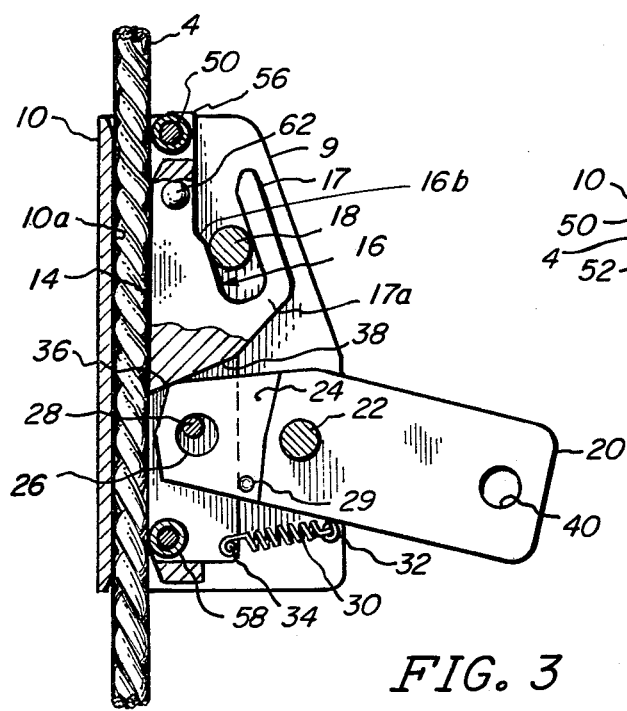
FIG. 3 is a vertical, section view of the safety clamp, similar to FIG. 3, but with additional portions cut away and showing the wedge plate of the safety clamp actuated to its clamping position.
Figure 1:
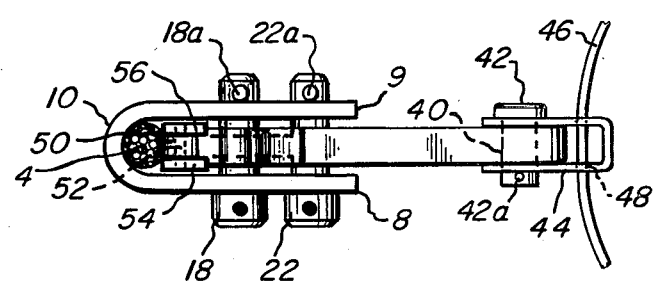
FIG. 1 is a top, plan view of the safety clamp structure.

As is shown in FIGS. 1, 2 and 4, the safety clamp is comprised of a clamping bracket generally indicated by reference numeral 6. Clamping bracket 6 preferably takes the form of an elongated, U-shaped member as shown having opposed, spaced apart side walls 8 and 9 joined together at one end by an upright, end wall segment 10, and open along their opposite ends. The inside, vertically extending surface 10a of end wall segment 10 serves as an elongated clamping surface which is constructed and arranged to bear against one side of safety cable 4 with clamping bracket 6 slidably mounted thereon in an upright position of use. With clamping bracket 6 so mounted on carrier 4, clamping surface 10a will extend generally parallel to safety cable 4. Shiftably supported on clamping bracket 6 between opposed side walls 8 and 9 is a wedge plate 12. When assembled in its position of use as shown, wedge plate 12 will be contained between clamping bracket side walls 8 and 9 parallel thereto, in an upright position. Wedge plate 12 is so mounted on clamping bracket 6 that the inner, elongated clamping side 14 of wedge plate 12 extends parallel to clamping surface 10a of bracket 6 in spaced apart relation thereto so as to accommodate the extension of safety cable 4 therebetween. A cam follower surface generally indicated by reference numeral 16 formed on the upper end of wedge plate 12 is positioned in coacting engagement with a stationary cam member 18 when wedge plate 12 is mounted in its normal position of use on bracket 6. For purposes hereinafter explained, cam follower surface 16 is comprised of a lower, inclined cam follower surface 16a, and an upper, more sharply contoured surface segment 16b. Cam follower surface 16 extends generally upwardly and inwardly from its lower end towards bracket clamping surface 10a and is disposed between camming member 18 and bracket clamping surface 10a in the manner shown. A guide finger 17 is affixed to wedge plate 12 in spaced apart relation to cam follower surface 16. The base end 17a of finger 17 is attached to wedge plate 12 as an extension thereof as shown in FIGS. 2 and 3. The parallel position and configuration of the inner surface of finger 17 with respect to cam follower surface 16 permits the desired movement of wedge plate 12 towards safety cable 4 in a manner hereinafter explained.

Camming member 18 preferably takes the form of a cylindrical pin mounted transversely on clamping bracket 6 across its side walls 8 and 9 so as to extend generally horizontally in its position of use as shown. Camming pin 18 is positioned between camming surface 16 and guide finger 17, with sufficient clearance space being provided between pin 18 and the inner surface of finger 17 to avoid interference with the desired clamping movement of wedge plate 12 against cable 4. For ease of installation of the entire safety clamp on a safety cable, camming pin 18 is removably inserted through apertures in bracket side walls 8 and 9. Pin 18 may be a commercially available holding pin having a spring loaded detent 18a at one end and an enlarged head on its opposite end, by means of which it is held in place on bracket 6. For the purposes of cooperative coaction between camming member 18 and cam follower surface 16, upper cam follower surface segment 16b is of arcuate shape and conforms to the shape of cylindrical camming pin 18. With wedge plate 12 in its rest or release position shown in FIG. 2, upper cam follower surface 16b will be positioned in engagement with camming pin 18. Arcuate camming surface 16b is contoured upwardly and sharply inwardly in a direction towards bracket clamping surface 10a in the manner shown most clearly in FIG. 3 to provide an initial, rapid thrust of wedge plate 12 towards cable 4 and bracket clamping surface 10a as explained below with respect to the operation of the safety clamp. Lower, inclined cam follower surface segment 16a also is directed upwardly and inwardly towards bracket clamping surface 10a, but is contoured less sharply inwardly towards clamping surface 10a from the vertical than arcuate surface segment 16b.

Wedge plate 12 is supported on the inner end of an actuating arm 20 which is removably attached to clamping bracket 6 by means of a pivot pin 22 extending transversely through bracket side walls 8 and 9 in a direction parallel to camming pin 18. Like camming pin 18, pivot pin 22 is removable, and is held in place by a spring loaded detent 22a on one end thereof. As appears most clearly in FIG. 4, the bottom end of wedge plate 12 is bifurcated to form a pair of spaced apart, downwardly extending plate segments 12a and 12b. The inner end 24 of actuating arm 20 is of reduced thickness, and is received between plate segments 12a and 12b of wedge plate 12, thereby serving to support wedge plate 12 between pivot pin 22 and bracket clamping surface 10a.

To ensure positive, driving association between the inner end of actuating arm 20 and wedge plate 12, these parts are mechanically linked together by means of a circular aperture and pin connection 26, 28. Aperture 26 extends through the inner end 24 of actuating arm 20; and pin 28 extends transversely through aperture 26, as well as through plate segments 12a and 12b of wedge plate 12, and is affixed thereto, as appears most clearly in FIG. 4.

A tension spring 30 is connected between actuating arm 20 and the bottom end of wedge plate 12 as shown in FIG. 3, so as to normally exert a downward, biasing force on the outer end of actuating arm 20. Spring 30 is connected between an attachment eye 32 on the bottom of arm 20, outwardly from its pivot pin connection 22 to wedge plate 12, and a pin 34 secured between the bottom ends of wedge plate segments 12a and 12b as shown in FIGS. 2 and 4. Spring 34 is sufficiently strong that under free fall conditions of the entire clamping bracket assembly on cable 4, it will pivot the outer end of actuating arm 20 downwardly about horizontally extending pivot pin 22, with the result that the inner end 24 of arm 20 will drive wedge plate 12 upwardly towards its closing or clamping position against cable 4. The attachment of actuating arm 20 to pivot pin 22 at a location between the outer, free end of arm 20 and the location of driving association of its inner end 24 with wedge plate 12 through connecting pin 28 ensures that wedge plate 12 will be driven upwardly in its closing movement towards cable 4, as the outer end of actuating arm 20 pivots downwardly.

For purposes hereinafter explained, a camming surface 36 is formed on the top edge of inner end 24 of actuating arm 20 and normally bears against the bottom end of an inclined guide surface 38 formed on wedge plate 12. Inclined guide surface 38 is located at the juncture of the upper ends of wedge plate bottom segments 12a and 12b at a location below cam follower surface 16. The upper edge of the inner end 24 of actuating arm 20 is angled as shown in FIG. 3 to conform to the slope of inclined cam guide surface 38, and will be disposed directly thereunder with actuating arm inner end 24 extending between wedge plate bottom segments 12a and 12b.

A further camming element is provided in the form of a laterally projecting pin 29 on the inner end of actuating arm 20. Pin 29 extends transversely through arm 20 and is affixed thereto as shown in FIGS. 2 and 4. The projecting ends of pin 29 normally bear against the outside edges of the lower ends of wedge plate bottom segments 12a and 12b. As illustrated in FIGS. 1 and 2, the outer, free end of actuating arm 20 has an aperture 40 extending therethrough, within which a removable pin 42 is received. The outer end of arm 20 projects outwardly away from clamping bracket 6 a sufficient distance that it may be readily received between the spaced apart side walls of a bifurcated buckle bracket or clip 44. Connecting pin 42 extends through the side walls of buckle bracket 44, as well as through aperture 40 in actuating arm 20 and is held in place to secure these two elements together by means of a spring loaded detent 42a. A belt 46 worn by a workman is extended through aligned slots 48 in buckle bracket 44, whereby bracket 44 serves as a means for connecting actuating arm 20, and the entire safety clamp assembly to a workman.

In order to ensure uniformly free movement of the clamp assembly up and down a cable during normal vertical movement by a workman, a pair of roller assemblies are provided at the top and bottom ends of wedge plate 12. As is shown most clearly in FIG. 4, wedge plate top roller 50 is rotatably supported on a roller pin 52 extending between laterally spaced, upper extensions 54 and 56 on wedge plate 12. Lower roller 58 is similarly supported on a pin 60 positioned between spaced apart plate segments 12a and 12b on the bottom end of wedge plate 12. Rollers 50 and 58 are positioned so that they will be in a direct alignment with safety cable 4. If either end of wedge plate 12 is canted into contact with cable 4 during normal vertical movement of the clamp assembly, free and unimpaired movement of the clamp assembly on the cable is ensured by rollers 50 and 58. The use of such rollers is particularly beneficial in allowing the clamp assembly to move freely up and down corroded cables, and different types of cables. It is to be noted that fixed pins can be used in place of removable pins 18 and 22 to provide a fixed rather than a portable safety clamp assembly. With such a fixed clamp, rollers as described above could be provided on the clamp bracket 6 between side walls 8 and 9, rather than on wedge plate 12.

Undesired lateral movement of the wedge plate within the clamping bracket is limited by laterally projecting protrusions on the opposite sides of the wedge plate. These protrusions preferably take the form of spherical segments 62 and 64 which bear lightly against the opposed inside faces of clamping bracket side walls 8 and 9. The tendency of the wedge plate to shift or cant laterally within the clamping bracket due to the interaction of the wedge plate with cable 4, and resultant binding between the wedge plate 12 and clamping bracket 6, is precluded by projections 62 and 64. The spherically rounded outer ends of these projections ensure minimum frictional contact with bracket side walls 8 and 9 and smooth, unrestricted clamping movement of wedge plate 12 in response to actuation by arm 20.

In operation, clamping bracket 6 is slidably mounted on safety carrier 4 at a desired vertical location of use, by slipping the U-shaped bracket 6 over safety cable 4 with cable 4 extending between bracket side walls 8 and 9. The wedge plate and actuating arm assembly 12, 20 is then inserted between the bracket side walls 8 and 9, these parts being held together by connecting pin 28. Wedge plate 12 and actuating arm 20 are held in place in their release or open positions shown in FIG. 2 by inserting camming pin 18 and pivot pin 22 in place through the bracket side walls. In this release position, wedge plate 12 will be spaced outwardly from safety cable 4 to provide a clearance space therebetween as shown in FIG. 2. With actuating arm 20 attached to the belt 46 of a workman through pin 42 and buckle 44, clamping bracket 6 will be free to slide up and down on cable 4 as the workman moves up and down on a ladder. When the workman is climbing, the upward movement of his body tends to pivot the outer end of actuating arm 20, through its connection with buckle 44 and the workman's belt 46, thereby holding arm 20 in its horizontal, release position against the downward bias of tension spring 30. As the workman descends the ladder, the entire clamping bracket assembly, including actuating arm 20, will drop together along safety cable 4; and the attachment of actuating arm 20 to the workman's belt will resist the force of spring 30 tending to pivot arm 20 downwardly towards its closing or clamping position. Finger 17 and camming pin 29 combine to prevent any pivotal movement of the top and bottom ends of wedge plate 12 away from vertical alignment with cable 4 during normal movement of the clamp assembly up and down the cable. Finger 17 resists the tendency of wedge plate 12 to shift or swing inwardly towards cable 4, and pin 29 prevents outward movement of wedge plate 12 away from cable 4 during such normal use. This wedge plate restraining and guiding function of finger 17 and pin 29, in cooperation with rollers 50 and 58, ensures free movement of the clamp assembly up and down cable 4.

If, however, the workman should fall or otherwise lose control, the safety clamp will instantly lock onto safety cable 4, thus supporting the workman and preventing a fall. The rotation of the outer end of actuating arm 20 downwardly is caused by the weight of the workman being applied at the outer end of arm 20 through his safety belt 46 and belt clip or buckle 44. In the case of a free fall, during which all of the components of the safety clamp assembly would normally fall together under the force of gravity, tension spring 30 imparts an unbalanced force to the outer end of arm 20 in a downward direction. As the outer end of arm 20 pivots downwardly about pivot pin 22, the inner end 24 of arm 20 pivots upwardly, thereby driving wedge plate 12 upwardly between camming pin 18 and safety cable 4. Because of the fact that upper cam follower surface segment 16b is contoured sharply inwardly towards cable 4, the slightest upward motion of wedge plate 12 in response to the pivotal movement of actuating arm 20 in its closing direction, will cause wedge plate 12 to instantly move across the clearance space between its clamping side 14 and carrier 4 into secure, clamping engagement with safety cable 4. As wedge plate 12 continues to move upwardly under the impetus of actuating arm 20, the engagement of upwardly and inwardly inclined cam follower surface segment 16a with camming pin 18 will force wedge plate 12 tightly against safety carrier 4. As a result, carrier 4 is tightly clamped between clamping surface 10a of clamping bracket 6 and clamping side 14 of wedge plate 12 along the length of these two clamping surfaces. Moreover, since wedge plate 12 moves in an upward direction during its closing motion, the frictional drag of safety cable 4 on wedge plate 12 will tend to pull it even more tightly into clamping engagement with cable 4. This achieves particularly strong holding power for the safety clamp on cable 4.

It is to be noted that cam follower surface 16 is formed along the upper end of wedge plate 12, and thus tends to move the upper end of wedge plate 12 upwardly and inwardly towards safety carrier 4 by engagement with camming pin 18. The coaction of camming surface 36 on the inner end 24 of actuating arm 20 with inclined cam guide surface 38 during the closing movement of wedge plate 12, ensures that its lower end will move upwardly and inwardly uniformly with its upper end. As the inner end 24 of actuating arm 20 pivots upwardly under free fall conditions, its camming surface 36 will revolve against inclined guide surface 38. Since cam guide surface 38 inclines upwardly and outwardly as shown, the engagement of camming surface 36 therewith will assist in urging wedge plate 12 upwardly and inwardly along its entire length in a uniform manner, in combination with the coaction between camming surface 16 and camming pin 18. Moreover, camming pin 29 on the inner end of arm 20 will be urged against the bottom end of wedge plate 12 as the inner end 24 of arm 20 swings upwardly. This provides a further, positive driving force urging the lower end of wedge plate 12 against cable 4. As a result, wedge plate 12 is maintained in the upright position shown with its clamping side 14 parallel to bracket clamping surface 10a at all times as it moves from its release position of FIG. 3 to its clamping position shown in FIG. 4.

It is also to be noted that aperture 26 in inner end 24 of actuating arm 20 provides sufficient clearance space with connecting pin 28 extending therethrough to permit the necessary shifting movement of wedge plate 12 towards cable 4 and bracket clamping surface 10a. This particular manner of mechanically linking actuating arm 20 and wedge plate 12 further ensures that wedge plate 12 will be able to move upwardly and inwardly in a uniform manner over its entire length and thereby remain in an upright position parallel to cable 4 and clamping surface 10a as actuating arm 20 drives it into its clamping position. As this actuating pivotal movement of arm 20 takes place, the relatively large clearance space between arm aperture 29 and wedge pin 28 allows the camming nose 36 of arm 20 to maintain contact with inclined surface 38 on wedge plate 12.

Those skilled in the art will appreciate that the safety clamp described and shown herein provides a particularly rapid response and very strong clamping action in frictional engagement with a safety carrier under free fall conditions which might be encountered by a workman falling from a ladder. Rollers 50 and 58 improve the ability of the clamp assembly to move freely up and down a safety cable. It is contemplated that these rollers could be provided with a radiused, concave surface conforming generally to the shape of the safety cable or rod. This would permit the rollers to directly track on the safety cable to further ensure that neither the wedge plate 12 or the clamping bracket 6 deviate from an upright position in alignment with the cable during normal use. Although I have described my improved safety clamp with respect to a particular, preferred embodiment thereof, I anticipate that various changes may be made in the size, shape and operation of the various components of the safety clamp without departing from the spirit and scope of my invention as defined by the following claims.

What is claimed is:

1. An improved safety device adapted to be secured to a person working at an elevated level and having means to releasably engage an elongated, vertically extending safety carrier such as a cable or rod, if the person falls, comprising:

a clamping bracket having an elongated clamping surface on one side thereof constructed and arranged to bear against one side of an elongated safety carrier on which said bracket is adapted to be slidably mounted in an upright position with said clamping surface extending generally parallel to the safety carrier;

a wedge plate shiftably supported on said bracket and having an elongated clamping side extending substantially parallel to said clamping surface of said bracket in spaced apart relation thereto for the extension of an elongated safety carrier therebetween, the lower end of said wedge plate being freely mounted with respect to said upper end;

a cam follower surface on the upper end of said wedge plate disposed in coacting engagement with a camming member secured to said clamping bracket, with said cam follower surface positioned between said camming member and said bracket clamping surface, and said cam follower surface extending generally upwardly and inwardly towards said bracket clamping surface;

an actuating arm pivotally attached to said clamping bracket for pivotal movement about a horizontal axis and projecting outwardly therefrom away from said bracket clamping surface, the outer, free end of said arm having means thereon for attachment to a workman, and the inner end of said arm being drivingly associated with said wedge plate with the point of pivotal attachment of said actuating arm to said clamping bracket being between the outer, free end of said arm and the location of driving association of the inner end of said arm with said wedge plate whereby the upward pivotal movement of said arm inner end imparts upward movement to said wedge plate, and said cam follower surface being on a portion of said wedge plate above said location of driving association of the inner end of said arm with said wedge plate; and a camming element on the inner end portion of said actuating arm normally bearing against the lower end portion of said wedge plate at a location outwardly from said clamping side thereof, and below said location of driving association of the inner end of said arm with said wedge plate whereby a downward force generated on the outer end of said actuating arm will pivot the inner end of said arm upwardly, and the driving association of the inner end of said arm with said wedge plate will carry said wedge plate upwardly against said camming member to urge said wedge plate inwardly against a safety carrier, with said camming element serving to simultaneously urge the lower end of said wedge plate inwardly against the safety carrier as the inner end of said arm pivots upwardly.

2. A safety device as defined in claim 1 wherein: said camming element is in the form of a pin protruding laterally from the inner end of said actuating arm and bearing against the outer side of said wedge plate opposite said clamping side thereof.

3. A safety device as defined in claim 1 wherein: a tension spring is so connected between said actuating arm and said wedge plate as to normally exert a biasing force on the outer end of said actuating arm in a downward direction and thereby pivot said actuating arm inner end upwardly to move said wedge plate upwardly against said camming member.

4. A safety device as defined in claim 1 wherein: said wedge plate has an inclined cam guide surface at a location thereon below said cam follower surface which angles upwardly and outwardly in a direction away from said clamping side of said wedge plate; and the inner end of said actuating arm has a camming surface thereon normally bearing against the bottom end of said inclined guide surface of said wedge plate in driving association therewith, whereby, as the inner end of said actuating arm pivots upwardly, said camming surface thereon will revolve against said inclined guide surface and thereby guide said wedge plate upwardly and inwardly and assist in maintaining said wedge plate in an upright position with its clamping side parallel to said bracket clamping surface as it moves to said clamping position against said camming member.

5. A safety device as defined in claim 4 wherein: said inner end of said actuating arm has an aperture therethrough, and said arm is mechanically linked to said wedge plate by a pin extending transversely through said wedge plate and aperture, and affixed to said wedge plate, there being sufficient clearance between said pin and said aperture to permit unrestrained clamping movement of said wedge plate upwardly and inwardly towards a safety carrier in response to the driving action of said arm camming surface against said inclined guide surface of said wedge plate.

6. A safety device as defined in claim 1 wherein: at least one roller is rotatably mounted at one end of said wedge plate in position to be in direct alignment with a safety cable on which said safety device is mounted, said roller serving to assist the smooth, free movement of said device up and down a safety carrier by rolling contact therewith, during normal vertical movement of said safety device with a workman.

7. A safety device as defined in claim 1 wherein: said camming member is a pin mounted transversely on said clamping bracket and extending generally horizontally in its position of use; and a guide finger affixed to said wedge plate in spaced apart relation thereto with its inner surface parallel to said cam follower surface, and said camming pin being positioned between said cam follower surface and said guide finger.

8. An improved safety device adapted to be secured to a person working at an elevated level and having means to releasably engage an elongated, vertically extending safety carrier such as a cable or rod, if the person falls, comprising:

a clamping bracket having an elongated clamping surface on one end thereof constructed and arranged to bear against one side of an elongated safety carrier on which said bracket is adapted to be slidably mounted in an upright position with said clamping surface extending generally parallel to the safety carrier, said bracket being in the form of an elongated, U-shaped member defined by opposed, spaced apart side walls jointed together at their inner ends by an upright end wall segment which forms said bracket clamping surface;

a wedge plate shiftably supported on said bracket between said bracket side walls in an upright position and having an elongated clamping side extending substantially parallel to said bracket clamping surface in spaced apart relation thereto for the extension of an elongated safety carrier therebetween;

a cam follower surface on one end of said wedge plate disposed in coacting engagement with an elongated camming member extending transversely between said bracket side walls and secured thereto, said cam follower surface being positioned between said elongated camming member and said bracket clamping surface and extending generally upwardly and inwardly toward said bracket clamping surface;

an elongated guide finger affixed to said wedge plate in spaced apart, parallel relation to said cam follower surface thereon with said elongated camming member being positioned between said guide finger and said cam follower surface; and an actuating arm pivotally attached to said clamping bracket for pivotal movement about a horizontal axis and projecting outwardly away from said bracket clamping surface, the outer, free end of said arm having means thereon for attachment to a workman, the inner end of said arm having contact means thereon drivingly associated with said wedge plate for imparting upward movement to said wedge plate as the outer end of said arm pivots downwardly, and said arm inner end being mechanically linked to said wedge plate by a pin and aperture connection providing sufficient clearance to permit unrestrained clamping movement of said wedge plate upwardly and inwardly towards a safety carrier, whereby, with said clamping bracket in said upright position, a downward force on the outer end of said actuating arm will pivot the inner end of said arm upwardly, with the result that the inner end of said arm will carry said wedge plate upwardly against said elongated camming member, whereby said wedge plate will be urged upwardly and inwardly to a clamping position with its clamping side brought into engagement with an elongated safety carrier to clamp said carrier between said bracket clamping surface and said clamping side of said wedge plate.

9. A safety device as defined in claim 8, and further including:

a pair of laterally projecting protrusions in the form of spherical segments on opposite sides of said wedge plate immediately adjacent to the inside surfaces of said spaced apart side walls of said clamping bracket, whereby undesired lateral movement of the wedge plate within said clamping bracket is limited by contact of said protrusions with the inside faces of said bracket side walls.

10. A safety device as defined in claim 8 wherein:

said wedge plate has an inclined cam guide surface at a location thereon below said cam follower surface which angles upwardly and outwardly in a direction away from said clamping side of said wedge plate; and the inner end of said actuating arm has a camming surface thereon normally bearing against the bottom end of said inclined guide surface of said wedge plate in driving association therewith, whereby, as the inner end of said actuating arm pivots upwardly, said camming surface thereon will revolve against said inclined guide surface and thereby guide said wedge plate upwardly and inwardly and assist in maintaining said wedge plate in an upright position with its clamping side parallel to said bracket clamping surface as it moves to said clamping position against said camming member.

11. A safety device as defined in claim 2 wherein:

said camming pin is attached to the inner end of said actuating arm at a location thereon below said horizontal axis of pivotal attachment of said actuating arm to said clamping bracket.

* * * * *